(12) United States Patent
Nishimura

(10) Patent No.: US 7,420,303 B2
(45) Date of Patent: Sep. 2, 2008

(54) MOTOR

(75) Inventor: Kiyoshi Nishimura, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 532 days.

(21) Appl. No.: 11/260,946

(22) Filed: Oct. 28, 2005

(65) Prior Publication Data

US 2006/0108885 A1 May 25, 2006

(30) Foreign Application Priority Data

Oct. 29, 2004 (JP) ............................. 2004-316964

(51) Int. Cl.
*H02K 5/16* (2006.01)
(52) U.S. Cl. ...................... 310/90; 310/49 R
(58) Field of Classification Search ............... 310/49 R, 310/90, 91, 254, 257, 40 MM
See application file for complete search history.

(56) References Cited

U.S. PATENT DOCUMENTS 5,811,903 A * 9/1998 Ueno et al. ................ 310/90
6,541,886 B2 * 4/2003 Mayumi ..................... 310/91
6,747,382 B2 * 6/2004 Yajima et al. ............... 310/90
6,995,487 B2 * 2/2006 Simpson et al. ............. 310/90
2007/0035190 A1 * 2/2007 Ueno ......................... 310/90
2007/0085433 A1 * 4/2007 Agematsu ................... 310/90
2007/0222313 A1 * 9/2007 Sonohara et al. ............ 310/90

OTHER PUBLICATIONS

Patent Abstracts of Japan, Publication No. 2003-324892 / published on Nov. 14, 2003 "Motor" Sankyo Seiki Mfg, Co., Ltd. (Appln No. 2002-129213 / Apr. 30, 2002).

* cited by examiner

*Primary Examiner*—Dang D Le
(74) *Attorney, Agent, or Firm*—Reed Smtih LLP

(57) ABSTRACT

A motor includes a bearing receiving the shaft end of a rotor, a bearing holder provided with a through hole into which the bearing is inserted, a spring member which is disposed on one end side of the bearing holder and provided with a plate spring part which urges the bearing in the through hole toward the shaft end of the rotor shaft, four engaging recessed parts formed at four portions on an outer peripheral side face of the bearing holder, and four engaging pawl parts formed in the spring member. The spring member is mounted on the bearing holder such that the four engaging pawl parts engage with the four engaging recessed parts through the outer peripheral side face of the bearing holder.

8 Claims, 6 Drawing Sheets

[Fig. 1]
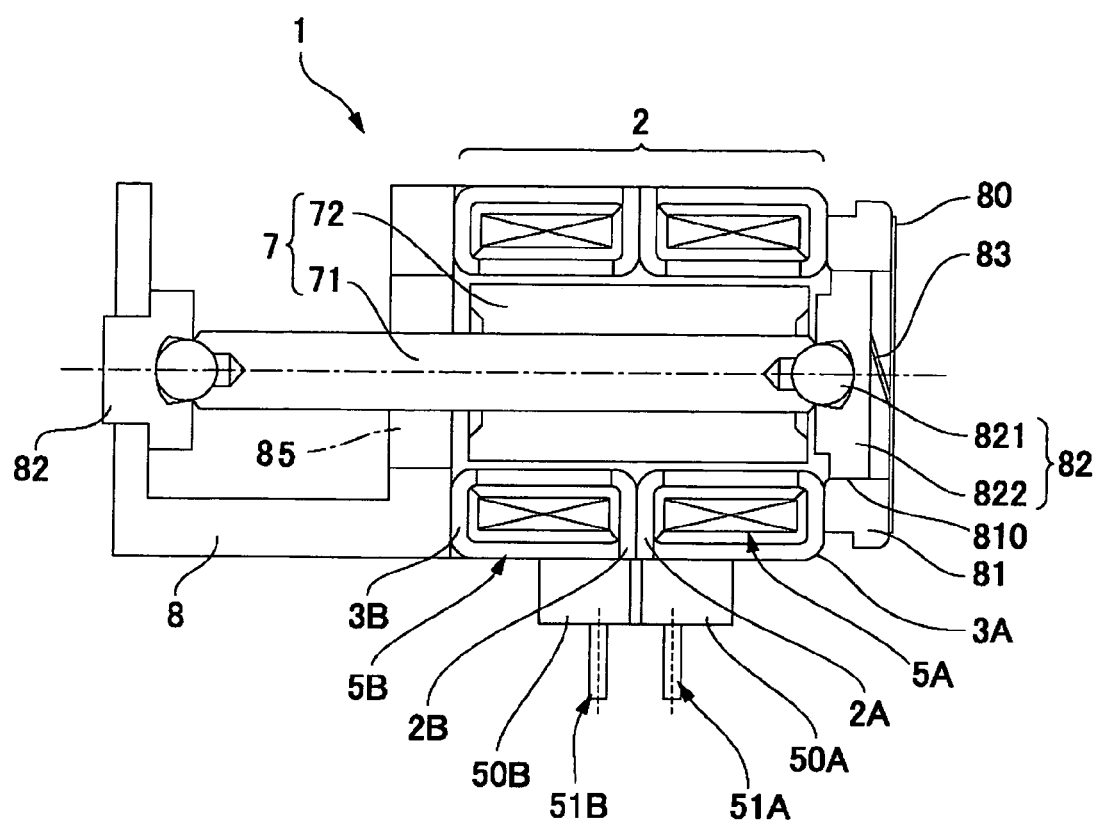

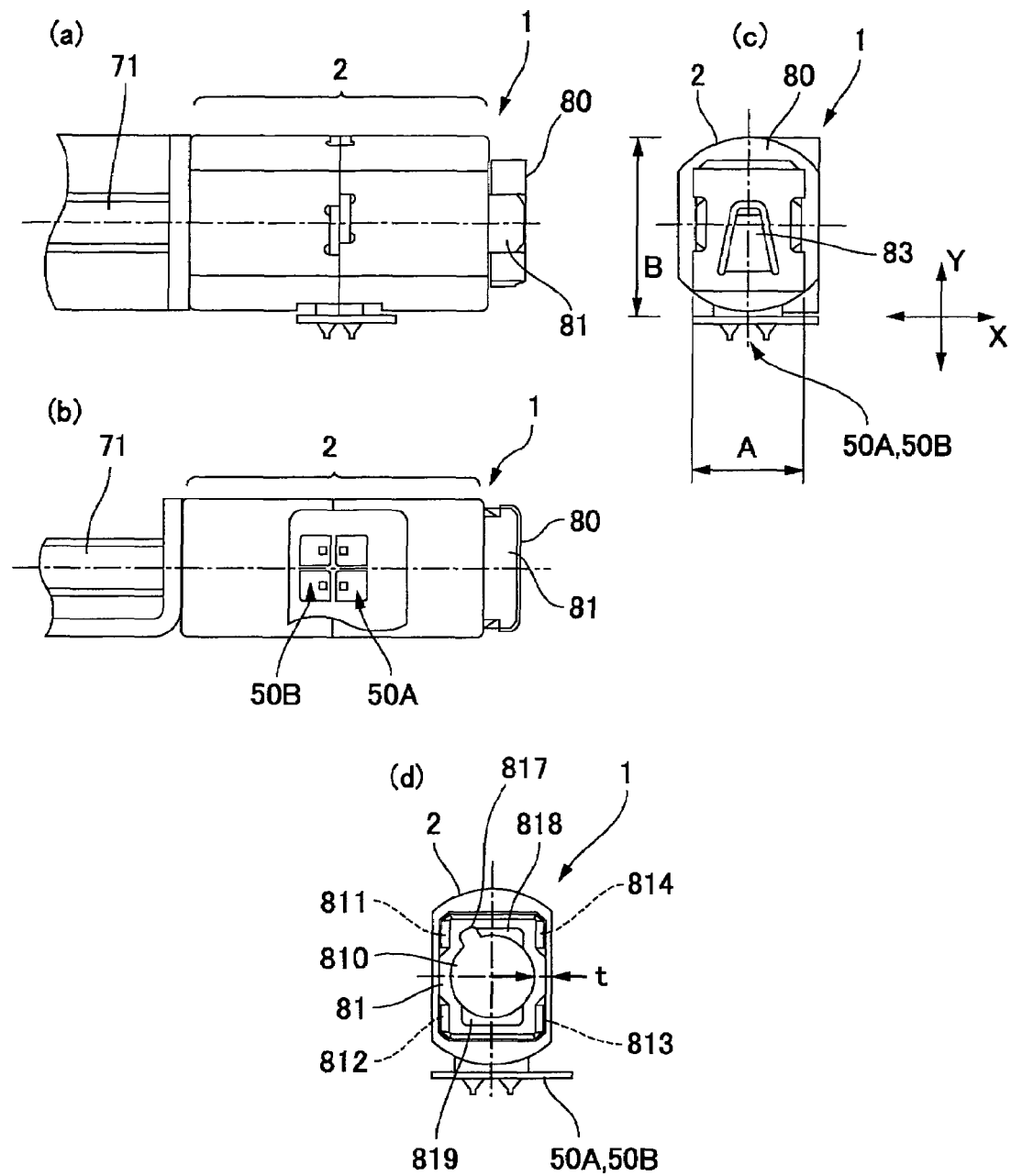

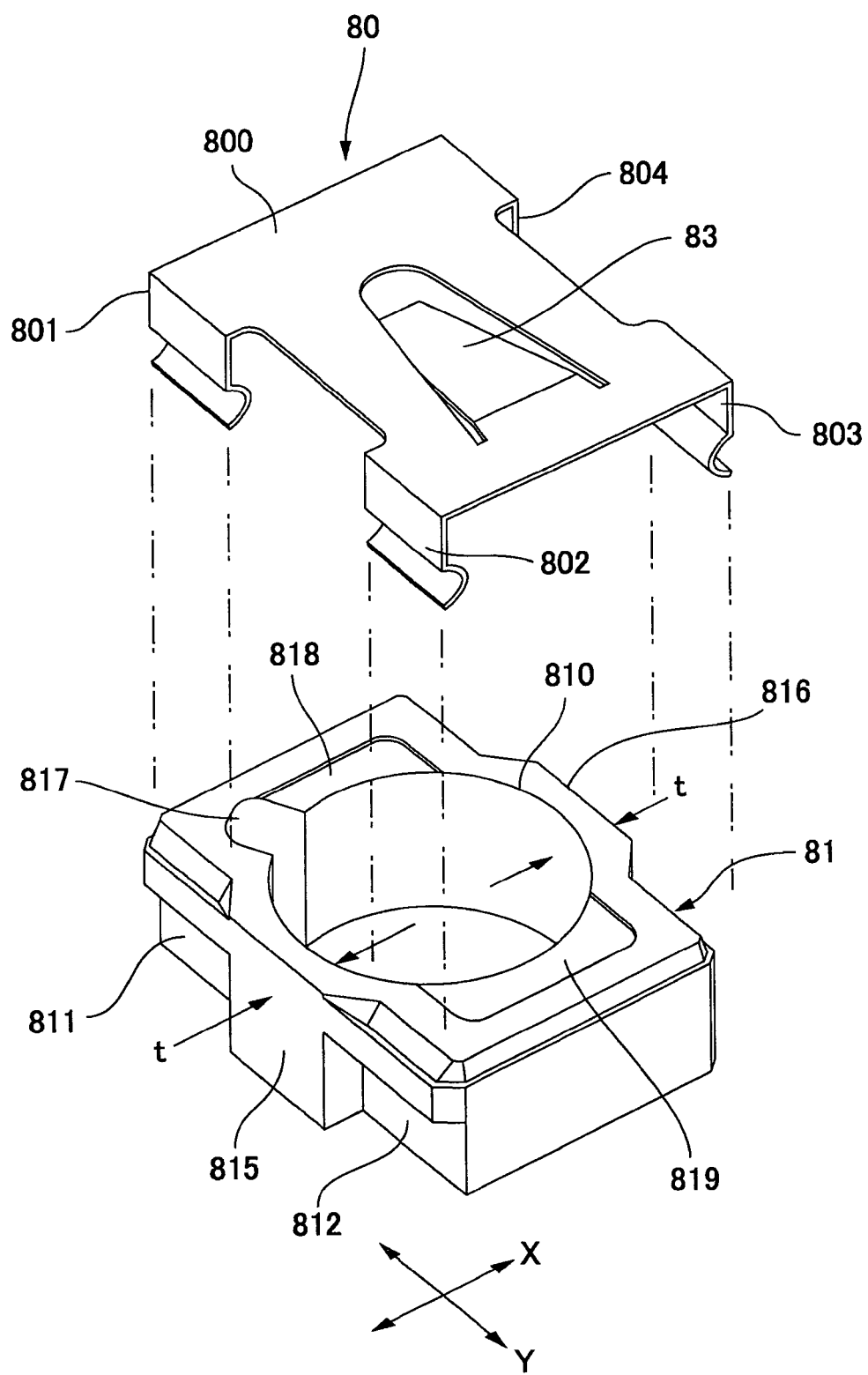
[Fig.3]

[Fig. 4]
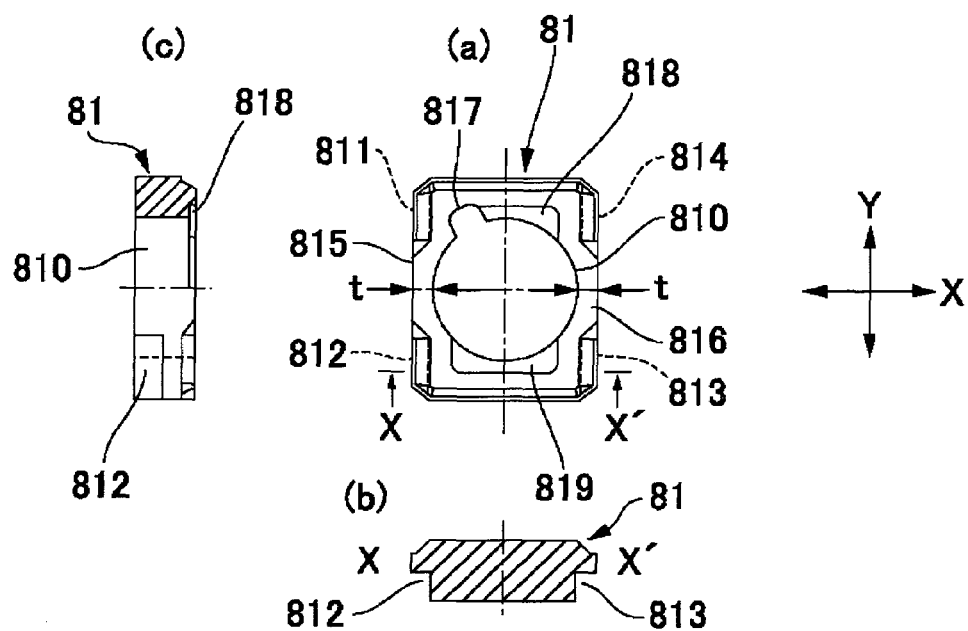
[Fig. 5]
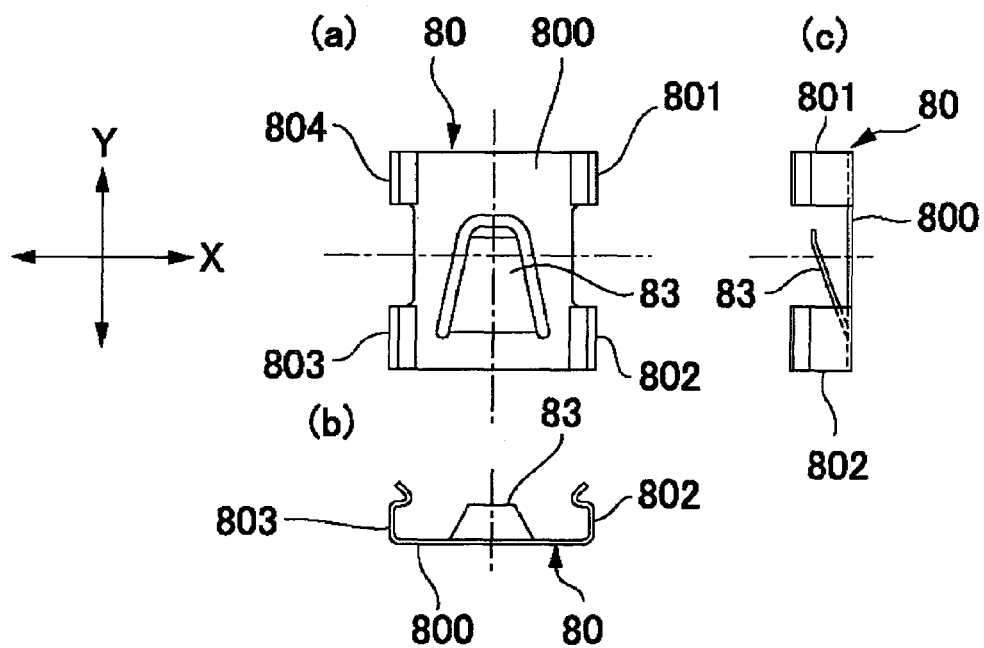

[Fig. 6]
(a)
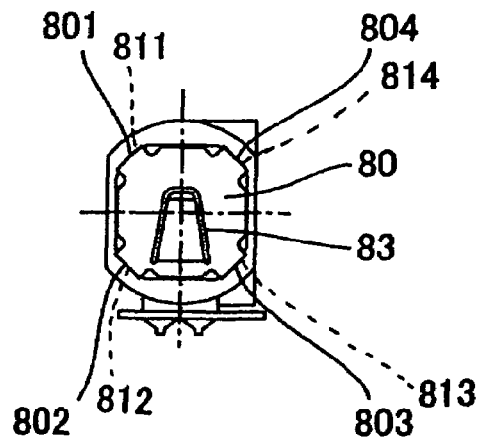
(b)
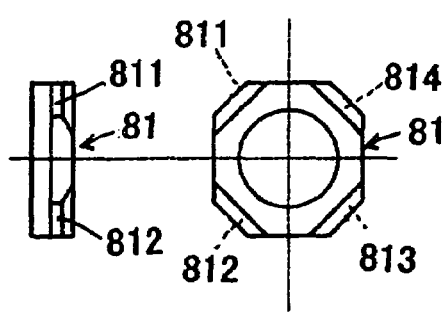
(c)
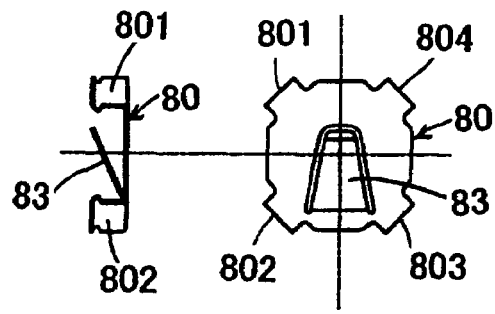
(d)
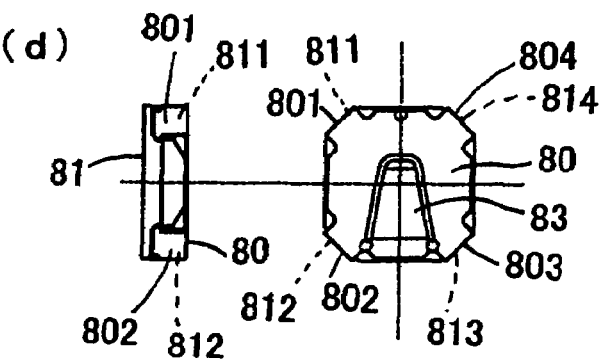

[Fig. 7]
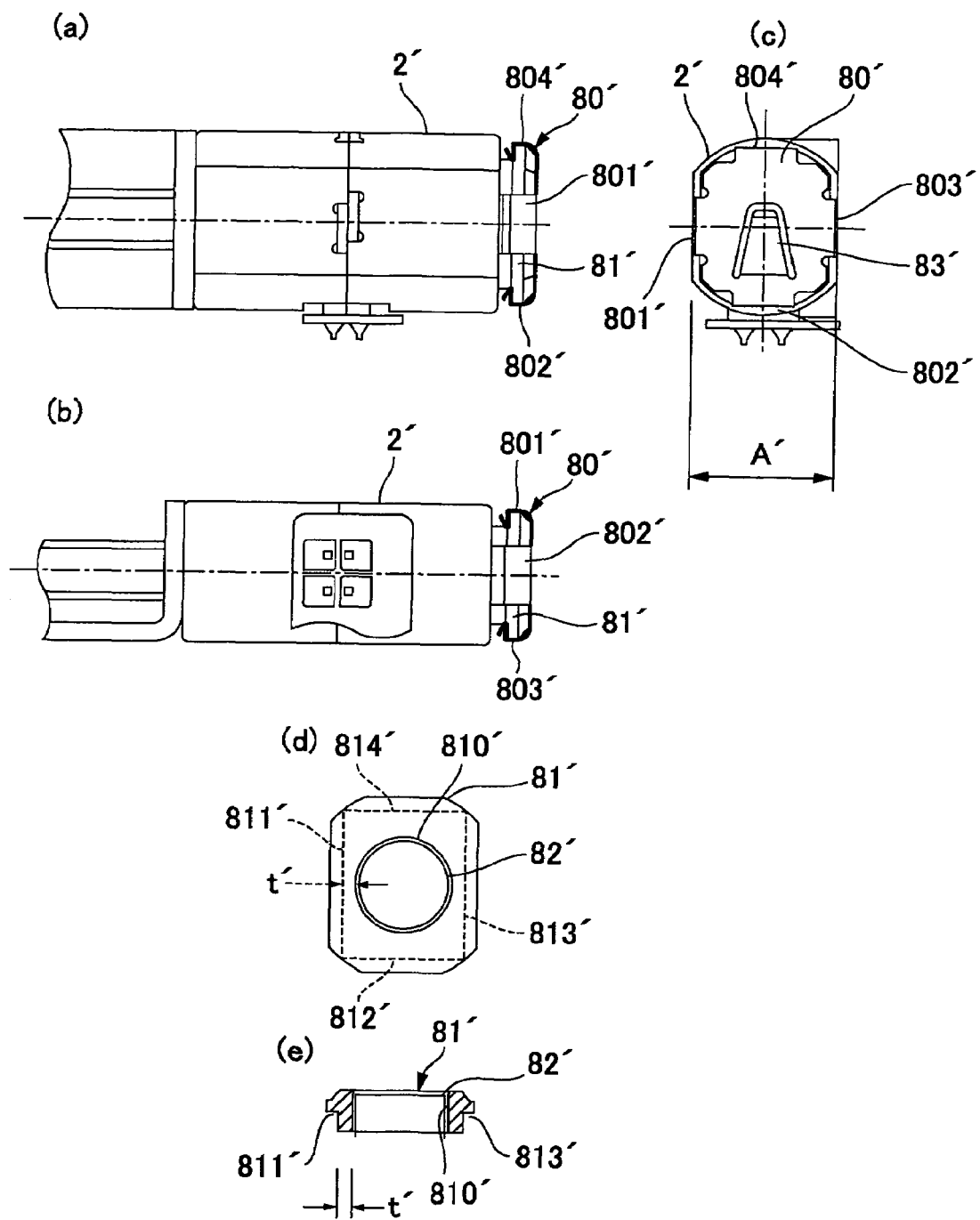

MOTOR

CROSS-REFERENCE TO RELATED APPLICATIONS

This application claims priority to Japanese Application No. 2004-316964 filed Oct. 29, 2004, which is incorporated herein by reference.

FIELD OF THE INVENTION

The present invention relates to a motor. More specifically, the present invention relates to a mounting structure of a spring member which urges a bearing toward the axial end of a rotor shaft.

BACKGROUND OF THE INVENTION

As shown in FIGS. 7(a), 7(b), 7(c), 7(d) and 7(e), a small-sized stepping motor which is used in a digital camera, a digital video camera, a slim ODD or the like commonly includes a case 2' within which a rotor and a coil are disposed, a pivot bearing 82' which receives the axial end of a rotor shaft of the rotor on one end side of this case 2', and a bearing holder 81' provided with a through hole 810' into which the pivot bearing 82' is inserted. Further, a spring member 80' provided with a flat spring part 83', which urges the pivot bearing 82' in the through hole 810' to the axial end of the rotor shaft, is disposed on a further end side of the bearing holder 81' (see, for example, Japanese Patent Laid-Open No. 2003-324892).

In the stepping motor constructed as described above, the case 2' is commonly formed in a circular cylindrical shape when the case is cut in a direction perpendicular to the axial line of the motor. Alternatively, as shown in FIGS. 7(a) and 7(b), the case of some motors may be formed in an elliptical cross-section in order that the thickness dimension of the motor in a direction perpendicular to the axial line of the motor, i.e., in the radial direction of the motor is made smaller. In any case, the spring member 80' is required to be mounted to the bearing holder 81'. Therefore, conventionally, four engaging pawl parts 801', 802', 803', 804' are formed in the spring member 80' so as to engage with the bearing holder 81' through a substantially central portion of the outer peripheral side face of the bearing holder 81'.

In such a stepping motor, it is required that the thickness dimension in a direction perpendicular to the axial line of a motor, for example, the dimension "A"' is further made smaller and thus the engaging portion of the spring member 80' with the bearing holder 81' is also required to be made smaller. However, since the through hole 810' into which the pivot bearing 82' is inserted is formed in the bearing holder 81', the wall thickness "t"' of the periphery of the through hole 810' is required to be made too thin when portions 811', 812', 813', 814' (see FIGS. 7(d) and 7(e)), with which the engaging pawl parts 801', 802', 803', 804' of the spring member 80' engage, are made thinner in the bearing holder 81'. Therefore, the accuracy of the dimension and shape of the through hole 810' is significantly reduced.

Further, it is conceivable that the number of the engaging portions is reduced to two portions from four but, in this case, a fixing force is reduced and thus shock resistance is lowered. In addition, the engagement with two portions is capable of positioning in only one direction and thus another positioning mechanism is required to be added for positioning in another direction.

Further, it is conceivable that the spring member 80' is formed to be even thinner. However, in this case, the strength of the spring member 80' is reduced and the spring force of a flat spring portion becomes unstable.

OBJECT AND SUMMARY OF THE INVENTION

In view of the above-mentioned problems, it is a primary object and advantage of the present invention to provide a motor which is capable of mounting a spring member to a bearing holder without reducing the dimensional accuracy of a through hole and the strength of the spring member even when the dimension in a direction perpendicular to the axial direction of the motor is reduced.

In order to achieve the above object and advantage, according to an embodiment of the present invention, there is provided a motor including a case in which a rotor and a coil are accommodated, a bearing which receives the shaft end of the rotor shaft of the rotor at one end side of the case, a roughly quadrangular bearing holder which is provided with a through hole into which the bearing is inserted, and a spring member which is disposed on one end side of the bearing holder and provided with a plate spring part which urges the bearing in the through hole toward the shaft end of the rotor shaft. Further, four engaging recessed parts are formed at four near corner portions on an outer peripheral side face of the bearing holder and four engaging pawl parts are formed in the spring member. The spring member is mounted on the bearing holder such that the four engaging pawl parts engage with the four engaging recessed parts through the outer peripheral side face of the bearing holder.

The roughly quadrangular shape in this specification of the present invention includes a quadrangular shape, a quadrangular shape with rounded corner portions, a nearly circular shape or the like, i.e., all the shapes having corner portions. Further, the roughly rectangular shape in this specification includes a rectangular shape, a rectangular shape with rounded corner parts, a shape similar to an elliptical shape and an elongated circular shape and the like.

In accordance with an embodiment of the present invention, an engaging recessed part is formed at each of four near corner portions of the outer peripheral side face of the bearing holder and four engaging pawl parts of the spring member engage with the engaging recessed parts through the outer peripheral side face of the bearing holder. In other words, the engaging recessed parts are formed at four near corner portions of the bearing holder whose thickness is larger, which is different in the conventional case in that the four engaging recessed parts are formed at generally center portions of the outer peripheral side face of bearing holder. Therefore, even when the dimension of the motor is reduced, sufficient thickness between the engaging recessed parts and the through hole is secured. Accordingly, when the bearing holder is produced, the through hole can be formed with a high degree of dimensional accuracy. Further, the spring member is mounted to the bearing holder at four portions and thus a fixing force is stronger and a high degree of shock resistance can be obtained. Moreover, the engaging recessed parts are formed at four near corner portions of the bearing holder whose thickness is larger. Therefore, even when the dimension of the motor is reduced in any direction perpendicular to the axial direction of the motor, the spring member can be mounted to the bearing holder by using the four engaging pawl parts.

In accordance with an embodiment of the present invention, the bearing holder is formed in a roughly rectangular shape in which dimensions in two directions perpendicular to the axial direction of the rotor shaft are different from each other, and the engaging recessed parts are formed at both near corner portions of two outer peripheral side faces which are opposite to each other in a direction with a shorter dimension.

Further, in accordance with an embodiment of the present invention, the bearing holder is formed in a roughly rectangular shape in which dimensions in two directions perpendicular to the axial direction of the rotor shaft are different from each other, and the engaging recessed parts are formed at four corner portions of the outer peripheral side face of the bearing holder.

In accordance with an embodiment of the present invention, it is preferable that a first protruded part is formed on the outer peripheral side face of the bearing holder so as to be located between two engaging recessed parts of four engaging recessed parts, and a second protruded part is formed on the outer peripheral side face of the bearing holder so as to be located between the other two engaging recessed parts. Two engaging pawl parts located on both sides of the first protruded part abut with the first protruded part from both sides, and the other two engaging pawl parts located on both sides of the second protruded part abut with the second protruded part from both sides. According to the construction described above, the spring member can be positioned to the bearing holder in two different directions by making the engaging pawl parts engage with the engaging recessed parts.

In accordance with an embodiment of the present invention, the four engaging pawl parts engage with the respective recessed parts elastically and, alternatively, the four engaging pawl parts are fixed to the engaging recessed parts by caulking.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 1 is a cross-sectional view showing a stepping motor in accordance with an embodiment of the present invention;

FIG. 2(a) is a plan view showing the stepping motor shown in FIG. 1, FIG. 2(b) is its bottom view, FIG. 2(c) is its right side view and FIG. 2(d) is its right side view showing the state where a spring member is removed;

FIG. 3 is an explanatory perspective view showing a bearing holder and a spring member which are used in a stepping motor in accordance with an embodiment of the present invention;

FIG. 4(a) is a plan view showing a bearing holder which is used in a stepping motor in accordance with an embodiment of the present invention, FIG. 4(b) is its front view, and FIG. 4(c) is its left side view which is cut partially;

FIG. 5(a) is a plan view showing a spring member which is used in a stepping motor in accordance with an embodiment of the present invention, FIG. 5(b) is its front view and FIG. 5(c) is its right side view;

FIG. 6(a) is a right side view showing a stepping motor in accordance with another embodiment of the present invention, FIG. 6(b) illustrates explanatory side and plan views showing a bearing holder which is used in the stepping motor, FIG. 6(c) illustrates explanatory side and plan views showing a spring member used in the stepping motor, and FIG. 6(d) illustrates explanatory side and plan views showing the state where the spring member is mounted on the bearing holder; and FIG. 7(a) is a plan view showing a conventional stepping motor, FIG. 7(b) is its bottom view, FIG. 7(c) is its right side view, FIG. 7(d) is a plan view showing a bearing holder, and FIG. 7(e) is a cross-sectional view showing the bearing holder.

DETAILED DESCRIPTION OF THE PREFERRED EMBODIMENTS

Embodiments of the present invention will be described below with reference to the accompanying drawings.

FIG. 1 is a cross-sectional view showing a stepping motor to which the present invention is applied. FIG. 2(a) is a plan view showing the stepping motor shown in FIG. 1, FIG. 2(b) is its bottom view, FIG. 2(c) is its right side view and FIG. 2(d) is its right side view showing the state where a spring member is removed.

In FIG. 1 and FIGS. 2(a) and 2(b), a motor 1 in accordance with an embodiment of the present invention is a small-sized stepping motor which is used in a digital camera, a digital video camera, a slim ODD or the like. A first ring-shaped bobbin 5A and a second ring-shaped bobbin 5B, around which coils are respectively wound, are disposed so as to be superposed to each other in the axial direction of the motor. A plurality of pole teeth of inner stators 2A, 2B and outer stators 3A, 3B are constructed so as to be disposed in a circumferential direction in a rotor disposing hole which is constructed by the first bobbin 5A and the second bobbin 5B. A rotor 7 includes a rotor magnet 72 which is fixed around a rotor shaft 71. The rotor magnet 72 faces the pole teeth of the stators through a prescribed clearance in the rotor disposing hole. A plate 8 is fixed on the outer stator 3B and the rotor shaft 71 is supported by a thrust bearing 82 which is held by the plate 8. The rotor shaft 71 may be supported by a radial bearing 85 which is held by the plate 8 as shown by the alternate long and short dash line in FIG. 1.

The rotor shaft 71 is also supported by a pivot bearing 82 which is disposed on one end side in the axial direction of the motor (first bobbin 5A side). The pivot bearing 82 includes a ball 821 and a main body part 822 which holds the ball 821 rotatably.

The main body part 822 of the pivot bearing 82 is inserted into the through hole 810 of the bearing holder 81 which is made of resin or the like. A spring member 80 formed of a thin metal plate is disposed on the further end side of the bearing holder 81. The end part of the main body part 822 of the pivot bearing 82 disposed in the through hole 810 is urged toward the shaft end of the rotor shaft 71 by the plate spring part 83 which is cut and bent from the spring member 80. The bearing holder 81 is fixed to the outer stator 3A by welding or the like and the spring member 80 is mounted to the bearing holder 81 with an engaging mechanism described below.

Terminal parts 50A, 50B are constructed on the outer side in a radial direction of the first bobbin 5A and the second bobbin 5B. The terminals of a wire is wound around the terminal pins 51A, 51B of the terminal parts 50A, 50B. The outer peripheral portions of the outer stators 3A, 3B construct a case 2 and the terminal parts 50A, 50B protrude from the aperture part of the case 2.

The motor 1 having a structure described above is formed in a roughly rectangular shape in order to reduce the dimension in the direction perpendicular to the axial line of the motor. The roughly rectangular shape in this specification includes a rectangular shape, a rectangular shape with rounded corner parts, a shape similar to an elliptical shape and an elongated circular shape and the like.

FIG. 3 is an explanatory perspective view showing the bearing holder and the spring member which are used in the stepping motor to which the present invention is applied. FIG.

4(a) is a plan view showing the bearing holder, FIG. 4(b) is its front view, and FIG. 4(c) is its left side view which is cut partially. FIG. 5(a) is a plan view showing the spring member, FIG. 5(b) is its front view and FIG. 5(c) is its right side view.

In an embodiment of the present invention, the bearing holder 81 and the spring member 80 having a structure shown in FIG. 3 are used to mount the spring member 80 to the bearing holder 81.

The bearing holder 81 is, as shown in FIG. 2(d), FIG. 3, FIGS. 4(a), 4(b) and 4(c), formed in a roughly rectangular shape in which the dimensions in two directions respectively perpendicular to the axial direction of the rotor shaft 71 are different. The circular through hole 810 into which the pivot bearing 82 is inserted is formed at a center portion of the bearing holder 81. Shallow recessed parts 818, 819 are formed on the outer side of the through hole 810 on the upper face of the bearing holder 81 such that the base portion of the plate spring part 83 of the spring member 80 does not abut with the bearing holder 81 in the state that the spring member 80 is mounted to the bearing holder 81. Further, the recessed parts 818, 819 are formed on both sides of the through hole 810. Therefore, even when the spring member 80 is mounted to the bearing holder 81 in either of the opposite directions, the base portion of the plate spring part 83 of the spring member 80 does not abut with the bearing holder 81.

A groove 817 is formed so as to be extended on an outer side from the through hole 810 in a radial direction and positioning of the bearing holder 81 to the outer stator 3A is performed by a positioning pin (not shown) at the time of jointing of the bearing holder 81 to the outer stator 3A.

Engaging recessed parts 811, 812, 813, 814 are formed at four corner portions of the outer peripheral side face of the bearing holder 81. Specifically, the engaging recessed parts 811, 812, 813, 814 are formed at a lower half part in the thickness direction of both of the corner portions of two outer peripheral side faces of the bearing holder 81, which are the faces opposite to each other in the direction of shorter dimension (X-direction). In other words, the engaging recessed parts 811, 812, 813, 814 are formed at four near corner portions with a large thickness of the bearing holder 81. Further, a first protruded part 815 is formed so as to be extended in a thickness direction between two engaging recessed parts 811, 812 on one of two outer peripheral side faces which are opposite to each other and a second protruded part 816 is formed so as to be extended in the thickness direction between two engaging recessed parts 813, 814 on the other outer peripheral side face. Portions of the upper face of the bearing holder 81 corresponding to the engaging recessed parts 811, 812, 813, 814 are formed in a tapered face.

As shown in FIG. 2(d), FIG. 3, FIGS. 5(a), 5(b) and 5(c), the spring member 80 is provided with a main plate part 800 in a roughly rectangular shape in which the dimensions in two directions respectively perpendicular to the axial direction of the rotor shaft 71 are different similarly to the bearing holder 81. The plate spring part 83 is formed so as to be cut and bent in the central portion of the main plate part 800.

Four engaging pawl parts 801, 802, 803, 804 are formed at both near corner portions of two side face portions which are opposite to each other in a direction of shorter dimension of the main plate part 800 (X-direction) of the spring member 80. The engaging pawl parts 801, 802, 803, 804 are engaged with the engaging recessed parts 811, 812, 813, 814 through the outer peripheral side face of the bearing holder 81. Four engaging pawl parts 801, 802, 803, 804 are respectively provided with an inside bent portion at its lower end side which is bent in an inner side direction. Therefore, when the main plate part 800 of the spring member 80 is put on the bearing holder 81, four inside bent portions of the engaging pawl parts 801, 802, 803, 804 are engaged with the engaging recessed parts 811, 812, 813, 814 through the respective outer peripheral side faces of the bearing holder 81. In this state, four engaging pawl parts 801, 802, 803, 804 engage with four engaging recessed parts 811, 812, 813, 814 elastically, and thus the spring member 80 is mounted to the bearing holder 82. Further, in this state, the spring member 80 is positioned in the X-direction.

Further, two engaging pawl parts 801, 802 which are located on both sides of the first protruded part 815 are abutted with the first protruded part 815 from both sides and the other two engaging pawl parts 803, 804 which are located on both sides of the second protruded part 816 are abutted with the second protruded part 816 from both sides. According to the construction described above, the spring member 80 is positioned in the Y-direction.

In the motor 1 constructed as described above, the engaging recessed parts 811, 812, 813, 814 are respectively formed at four near corner portions of the outer peripheral side face of the bearing holder 81 and four engaging pawl parts 801, 802, 803, 804 of the spring member 80 are engaged with the engaging recessed parts 811, 812, 813, 814 through the outer peripheral side face of the bearing holder 81. In other words, in an embodiment of the present invention, the engaging recessed parts 811, 812, 813, 814 are formed at four near corner portions of the bearing holder 81 whose thickness is larger, which is different in the conventional case in that the four engaging recessed parts 811, 812, 813, 814 are formed at generally center portions of the outer peripheral side face of bearing holder 81. Therefore, even when the dimension "A" of the motor 1 is reduced, the sufficient thickness "t" is secured between the engaging recessed parts 811, 812, 813, 814 and the through hole 810. Accordingly, when the bearing holder 81 is produced, the through hole 810 can be formed with a high degree of dimensional accuracy.

Further, the spring member 80 is mounted to the bearing holder 81 by using four engaging pawl parts 801, 802, 803, 804 and thus a fixing force is stronger and a high degree of shock resistance can be obtained.

The engagement of the four engaging pawl parts 801, 802, 803, 804 with the four engaging recessed parts 811, 812, 813, 814 are usually capable of positioning only in the X-direction. However, in an embodiment of the present invention, the engaging recessed parts 811, 812, 813, 814 are disposed in two outer peripheral side faces and each two of four engaging pawl parts 801, 802, 803, 804 are abutted with the first protruded part 815 and the second protruded part 816 from both sides. Therefore, the positioning in the Y-direction of the spring member 80 can be also performed.

Moreover, the engaging recessed parts 811, 812, 813, 814 are formed at four near corner portions of the bearing holder 81 whose thickness is larger. Therefore, even when the dimension "B" of the motor 1 is reduced, the spring member 80 can be mounted to the bearing holder 81 by using the four engaging pawl parts 801, 802, 803, 804.

In the embodiment of the present invention described above, the engaging recessed parts 811, 812, 813, 814 are formed at both near corner portions of two outer peripheral side faces which are opposite to each other in a direction of shorter dimension (X-direction). Alternatively, in accordance with another embodiment of the present invention, engaging recessed parts 811, 812, 813, 814 are obliquely formed at four corner portions of the outer peripheral side face of the bearing holder 81 and engaging pawl parts 801, 802, 803, 804 are obliquely formed at four corner portions of the spring member 80 as shown in FIGS. 6(a), 6(b), 6(c) and 6(d). FIG. 6(a)

is a right side view showing a stepping motor, FIG. 6(b) illustrates explanatory side and plan views showing the bearing holder which is used in the stepping motor, FIG. 6(c) illustrates explanatory side and plan views showing the spring member which is used in the stepping motor, and FIG. 6(d) illustrates explanatory side and plan views showing the state where the spring member is mounted on the bearing holder. Also in this construction described above, a sufficient wall thickness can be secured between the engaging recessed parts 811, 812, 813, 814 and the through hole 810, which is different from the conventional case that four engaging recessed parts 811, 812, 813, 814 are formed at generally center portions of the outer peripheral side faces of the bearing holder 81. Therefore, when the bearing holder 81 is produced, the through hole 810 can be formed with a high degree of dimensional accuracy. Further, since four engaging pawl parts 801, 802, 803, 804 and four engaging recessed parts 811, 812, 813, 814 are engaged with each other at four portions, the spring member 80 can be positioned in both the X-direction and the Y-direction.

In the embodiments described above, four engaging pawl parts 801, 802, 803, 804 are engaged with the engaging recessed parts 811, 812, 813, 814 with an elastic force such that the spring member 80 is fixed to the bearing holder 81. However, four engaging pawl parts 801, 802, 803, 804 may be fixed to the engaging recessed parts 811, 812, 813, 814 by caulking.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor comprising:
   a case in which a rotor and a coil are accommodated;
   a bearing for receiving a shaft end of a rotor shaft of the rotor at one end side of the case;
   a roughly quadrangular bearing holder having a through hole into which the bearing is inserted;
   a spring member being disposed on one end side of the bearing holder and being provided with a plate spring part which urges the bearing in the through hole toward the shaft end of the rotor shaft;
   four engaging recessed parts being formed at four near corner portions on an outer peripheral side face of the bearing holder; and
   four engaging pawl parts being formed in the spring member;
   said spring member being mounted on the bearing holder such that the four engaging pawl parts are engaged with the four engaging recessed parts through the outer peripheral side face of the bearing holder.

2. The motor according to claim 1, wherein the bearing holder is formed in a roughly rectangular shape in which dimensions in two directions perpendicular to an axial direction of the rotor shaft are different from each other, and the engaging recessed parts are formed at both near corner portions of two outer peripheral side faces which are opposite to each other in a direction with a shorter dimension.

3. The motor according to claim 1, wherein the bearing holder is formed in a roughly rectangular shape in which dimensions in two directions perpendicular to an axial direction of the rotor shaft are different from each other, and the engaging recessed parts are formed at four corner portions of the outer peripheral side face of the bearing holder.

4. The motor according to claim 1, further comprising:
   a first protruded part being formed on the outer peripheral side face of the bearing holder so as to be located between two engaging recessed parts of four engaging recessed parts; and
   a second protruded part being formed on the outer peripheral side face of the bearing holder so as to be located between the other two engaging recessed parts;
   two engaging pawl parts being located on both sides of the first protruded part abut with the first protruded part from both sides; and
   two other engaging pawl parts being located on both sides of the second protruded part abut with the second protruded part from both sides.

5. The motor according to claim 1, wherein the four engaging pawl parts are elastically engaged with the respective recessed parts.

6. The motor according to claim 1, wherein the four engaging pawl parts are fixed to the engaging recessed parts by caulking.

7. A motor comprising:
   a case in which a rotor and a coil are accommodated;
   a bearing for receiving a shaft end of a rotor shaft of the rotor at one end side of the case;
   a bearing holder having a through hole into which the bearing is inserted;
   a spring member being disposed on one end side of the bearing holder and being provided with a plate spring part which urges the bearing in the through hole toward the shaft end of the rotor shaft;
   four engaging recessed parts being formed at four portions on an outer peripheral side face of the bearing holder; and
   four engaging pawl parts being formed in the spring member;
   said spring member being mounted on the bearing holder such that the four engaging pawl parts engage with the four engaging recessed parts through the outer peripheral side face of the bearing holder.

8. The motor according to claim 7, further comprising:
   a first protruded part being formed on the outer peripheral side face of the bearing holder so as to be located between two engaging recessed parts of four engaging recessed parts; and
   a second protruded part being formed on the outer peripheral side face of the bearing holder so as to be located between the other two engaging recessed parts;
   two engaging pawl parts being located on both sides of the first protruded part abut with the first protruded part from both sides; and
   two other engaging pawl parts being located on both sides of the second protruded part abut with the second protruded part from both sides.

* * * * *